Dec. 28, 1954     W. A. BOWMAN     2,698,155
RECEPTACLE FOR USE IN MOTOR VEHICLES
Filed July 28, 1950
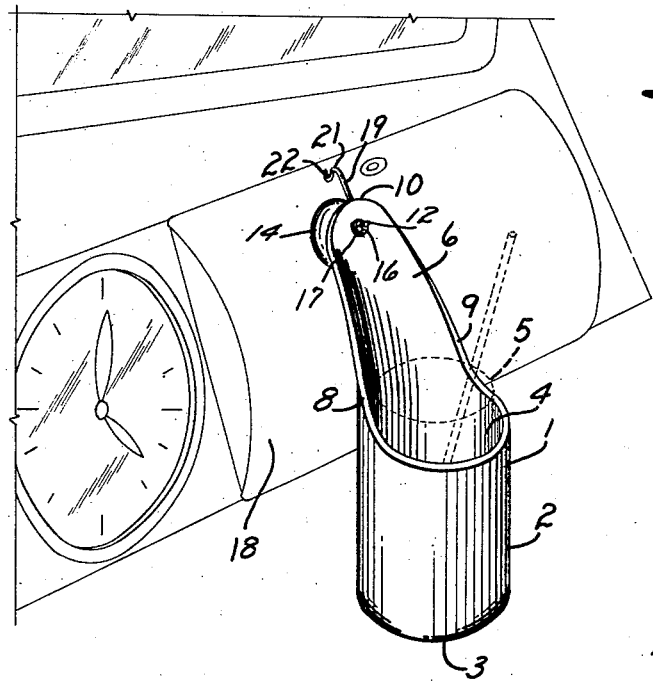
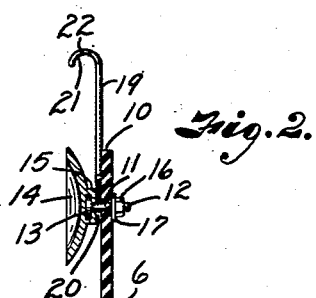
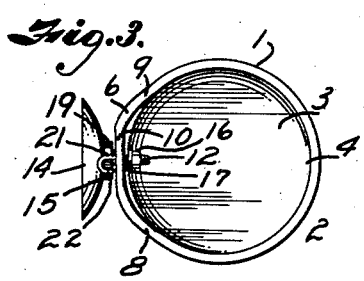
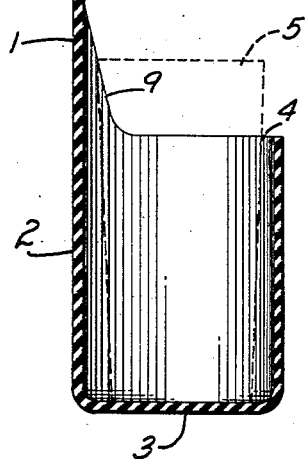
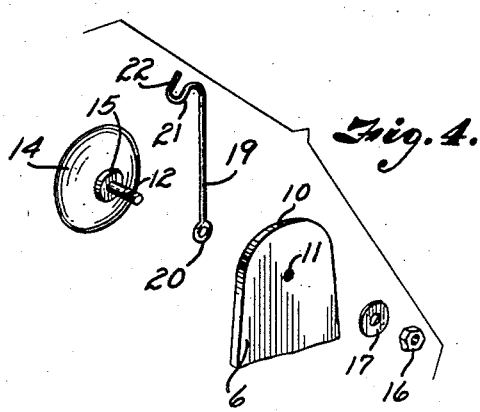
INVENTOR.
Wilma A. Bowman
BY
ATTORNEYS

United States Patent Office 2,698,155
Patented Dec. 28, 1954

2,698,155

RECEPTACLE FOR USE IN MOTOR VEHICLES

Wilma A. Bowman, Clinton, Mo.

Application July 28, 1950, Serial No. 176,408

1 Claim. (Cl. 248—311)

This invention relates to a receptacle for use in motor vehicles, and more particularly to a receptacle for holding a container, such as a glass, bottle or the like, on the dash, window or door of an automobile.

Heretofore, various articles have been devised for use in motor vehicles for retaining various items on trays and the like such as ash trays, cigarette trays, and containers for toilet materials and the like, but insofar as applicant is aware no one has devised a simple, economical receptacle which may be attached to the dash of an automobile or to the door thereof which will resiliently retain the article to be held in suspended position.

It is, therefore, the principal object of the present invention to provide a receptacle for glasses, bottles, or other containers of liquid which may be attached to the dash, window or door of a motor vehicle such as an automobile and held in suspended resilient position so as to not spill the contents of the container.

Other objects of the present invention are to provide a novel means of securing the receptacle to the dash, window or door of an automobile; to provide a receptacle of containers of liquid which will prevent moisture from collecting on the receptacle and consequent dripping on the floor of the car or on the occupant of the vehicle; and to provide a device of this character simple, economical to manufacture and efficient in operation.

In accomplishing these and other objects of the present invention I have provided improved details of structure, the preferred form of which is illustrated in the accompanying drawings wherein:

Fig. 1 is a perspective view of my receptacle shown attached to the dash of an automobile.

Fig. 2 is a vertical sectional view through the device.

Fig. 3 is a top plan view of the device.

Fig. 4 is a fragmentary view of the receptacle particularly illustrating the attaching parts of the device in disassembled relation.

Referring more in details to the drawings:

1 designates a receptacle embodying the features of my invention comprising a body 2 having a bottom 3, an open top 4 adapted to receive a container, such as a glass or the like, 5. I preferably make the body of the receptacle of plastic, fabric, rubber or other suitable pliable material and formed integral with one side thereof is an extension or supporting arm 6 having its sides tapered as indicated at 8 and 9 near the top of the body of the receptacle and ending in a rounded top 10 (Fig. 1). It will be noted the supporting arm 6 is slightly rounded near the center thereof as indicated by the shading in Fig. 1 and the immediate integral portion is cylindrical with the body portion, the entire receptacle being preferably molded in one piece.

While I do not wish to be limited to any particular shape of the receptacle, I have found the cylindrical body to be the most practical.

Near the center and top portion of the supporting neck or arm 6 is an opening 11 adapted to receive a threaded pin 12 having its opposite end 13 embedded in a suction cup 14. The bottom of the suction cup is provided with a boss 15 to form a rigid structure and the end 12 is inserted through the opening 11 and the supporting arm 6 and secured thereto by a nut 16, a washer 17 being provided between the nut and the supporting arm.

With the device constructed as thus far described, in use the suction cup may be secured to the dash 18 of an automobile or the glass window of a door, if desired. The supporting arm 6 is resilient and bendable so that it will conform to the contour of the dash of the automobile and still retain the receptacle in upright position so that the glass or other article in the receptacle will remain in an upright position and the contents of the glass will not spill therefrom due to rocking movement or jostling of the car. When the device is secured to the glass of the door of an automobile the supporting arm will, of course, be in a vertical position and will swing with the swing of the car.

The device may also be secured to the handle of a door of an automobile and when used at this position, I provide a hook 19 comprising a rod member having an eye 20 on one end adapted to receive and be secured on the threaded shank 12 of the cup member. The opposite end of the rod has a laterally and downturned portion 21 and thence turned upwardly and laterally forming a double hook as indicated at 22 for attachment to the handle. Used in this manner the suction cup will rest against the side of the door and constitute some support to the supporting arm so that it will also swing or sway with the movement of the automobile.

It will be obvious from the foregoing that I have provided an improved receptacle for attachment to the dash or door of an automobile to contain a glass or other container of liquids or the like so that the body of the receptacle will remain in upright position and will be resiliently suspended from the automobile so as to not spill the contents of the container in the receptacle.

What I claim and desire to secure by Letters Patent is:

A receptacle for a liquid container made from a single sheet of resilient material for attachment to the handle of an automobile door comprising, a cylindrical body having a closed bottom and continuous side walls for receiving the liquid container, said side walls being of a length to house a substantial portion of the container, a resilient arm, said arm being integral with said body and having its base attaching to substantially one-half of the rim of the body and tapered upwardly terminating in a rounded top, said arm having an opening near the outer end thereof, a bolt engaging in said opening, and a rod having one end engaging said bolt and its other end extending above said arm, the outer end of said rod being turned laterally and parallel to said arm and then turned outwardly and upwardly parallel with the first turned portion of the rod forming a hook having two recesses for engaging said handle whereby said handle with said hook will suspendingly support said receptacle.

References Cited in the file of this patent

UNITED STATES PATENTS

| Number | Name | Date |
|---|---|---|
| D. 149,261 | De Mott | Apr. 13, 1948 |
| 1,231,986 | Bennecke | July 3, 1917 |
| 2,215,411 | Sebring | Sept. 17, 1940 |
| 2,286,012 | Rochow | June 9, 1942 |
| 2,289,701 | Engst et al. | July 14, 1942 |
| 2,296,700 | Branstetter et al. | Sept. 22, 1942 |
| 2,406,334 | Keller et al. | Aug. 27, 1946 |
| 2,518,538 | Giblin | Aug. 15, 1950 |